(12) United States Patent
Crampton et al.

(10) Patent No.: US 6,591,153 B2
(45) Date of Patent: Jul. 8, 2003

(54) SYSTEM AND METHODS FOR SCHEDULING MANUFACTURING RESOURCES

(75) Inventors: Myrick Crampton, Germantown, MD (US); George Zdravecky, Washington, DC (US)

(73) Assignee: Manugistics, Inc., Rockville, MD (US)

( * ) Notice: Subject to any disclaimer, the term of this patent is extended or adjusted under 35 U.S.C. 154(b) by 13 days.

(21) Appl. No.: 09/974,801

(22) Filed: Oct. 12, 2001

(65) Prior Publication Data

US 2002/0107600 A1 Aug. 8, 2002

Related U.S. Application Data

(60) Provisional application No. 60/239,280, filed on Oct. 12, 2000.

(51) Int. Cl.[7] .............................................. G06F 19/00
(52) U.S. Cl. ..................... 700/103; 700/99; 700/100; 700/104; 700/111; 705/8
(58) Field of Search ........................... 700/99, 100, 103, 700/104, 111, 101, 102; 705/8

(56) References Cited

U.S. PATENT DOCUMENTS

| | | | | |
|---|---|---|---|---|
| 4,744,028 A | * | 5/1988 | Karmarkar | 705/8 |
| 5,369,570 A | | 11/1994 | Parad | 364/401 |
| 5,467,285 A | * | 11/1995 | Flinn et al. | 700/95 |
| 5,720,157 A | | 2/1998 | Ross | 53/445 |
| 5,764,543 A | | 6/1998 | Kennedy | 364/578 |
| 5,808,891 A | * | 9/1998 | Lee et al. | 700/108 |
| 5,835,377 A | * | 11/1998 | Bush | 700/99 |
| 5,983,195 A | | 11/1999 | Fierro | 705/10 |
| 6,308,107 B1 | * | 10/2001 | Conboy et al. | 700/121 |
| 6,415,196 B1 | * | 7/2002 | Crampton et al. | 700/100 |

* cited by examiner

Primary Examiner—Leo Picard
Assistant Examiner—Michael D Masinick
(74) Attorney, Agent, or Firm—Hogan & Hartson LLP

(57) ABSTRACT

A system and method for scheduling manufacturing resources based on user defined scheduling and routing goals. Attributes and constraints may be assigned to manufacturing resources and SKUs that facilitates the planning and scheduling of the resources. Resource transitions may be restricted only to desirable transition by using product wheels. Excess work-in-process may be minimized by scheduling orders that consume the excess work-in-process.

64 Claims, 15 Drawing Sheets

Product Wheel Example

PRODUCT WHEEL EXAMPLE PART II

| PRODUCT WHEEL NAME | FROM SKU | TO SKU | COST |
|---|---|---|---|
| OIL MIXER 1 | A | B | 20.00 |
| OIL MIXER 1 | A | C | 30.00 |
| OIL MIXER 1 | B | D | 3.00 |
| OIL MIXER 1 | C | D | |
| OIL MIXER 1 | D | A | |
| PACKAGER 1 | A | B | |

FIG. 10B

SYSTEM AND METHODS FOR SCHEDULING MANUFACTURING RESOURCES

CROSS REFERENCE TO RELATED APPLICATION

This application claims priority from U.S. Provisional Patent Application Serial No. 60/239,280, filed Oct. 12, 2000, the disclosure of which is hereby incorporated by reference by its entirety.

FIELD OF THE INVENTION

The invention relates to a system and method for solving manufacturing-scheduling (MS) problems. More specifically, the invention relates to a robust system and method for scheduling and planning manufacturing facilities and equipment based on pre-defined rules and goals.

BACKGROUND OF THE INVENTION

Scheduling of manufacturing resources, for example, materials, machinery, man hours, and the like, in response to customer orders has been a significant concern and problem in the field of manufacturing for almost as long as products have been manufactured. The best use of manufacturing facilities and equipment results in greater productivity and profit. The vast majority of MS problems have been resolved by humans without the aid of computer tools, particularly in businesses where the maximum use of the manufacturing equipment and facilities has not been essential to the success of the business.

The increasing size of businesses in general, the increased competition and the need to provide improved customer service and customization have magnified the difficulties of MS problems to the point where efficient human resolution of the issues posed has become impossible or at best highly inefficient. Consequently, MS software tools and process have been developed to address these issues.

Existing MS software tools and processes can be extremely complex to use and understand, and, in general, do not adapt conveniently to a variety of different businesses in an efficient way to address all of the specific issues particular to each individual business. Further, many of these existing tools lack the capability of recognizing and adapting to the specific needs of individual businesses. This is, in part, because of the complex nature of trying to solve MS problems. From a generic standpoint, the complexity of the MS problem results in the interaction of a relatively large number of factors necessary to create an adequate solution to the MS problem. The complexity of the MS software development process to accommodate the magnitude of issues involved, and the complexity of MS modeling of the business which is emulated by the software, have not permitted previous MS software processes to be as successful as expected. As a consequence, many prior MS software application have required the business characteristics to fit a relatively fixed model, rather than allow the individual business characteristics to form the model. The complexity of an MS program is considerable, typically requiring tens or hundreds of thousands of lines of software code. Writing an extensive amount of software code creates opportunities for numerous errors, thereby requiring extensive trial and error use to eliminate the unforeseen errors, which may only be revealed from such use. Therefore, writing additional code is not a desirable approach to solving individual MS problems.

This complexity exists despite the fact that many of the basic concepts involved in the MS model itself seem almost intuitive. Concepts, which may appear intuitive in MS situations, are usually accomplished in MS software only with considerable difficulty, effort and creativity.

For example, many businesses have multiple concurrent goals at any given time. The goals of a business will often be conflicting. To illustrate, many companies proscribe to or at least attempt to proscribe to the concept of just-in-time. Businesses that follow the just-in-time concept typically manufacture and deliver products just-in-time to meet the customer's due date. This allows manufacturers to minimize inventory reducing manufacturing and storage costs. However, many of these manufacturers may also like to maximize the use of their equipment or resources. That is, manufacturers prefer to minimize the idle time of their equipment or resources. Unfortunately, trying to merge these two goals will typically make the MS problem even more complex. In fact, sometimes these two goals may actually conflict with each other. Attempting to resolve conflicting goals of a business often produces mixed results.

Creating functional MS models has always been somewhat difficult and tedious. An MS model typically attempts to define and map the various resources available in a manufacturing facility. Unfortunately models for previous MS processes did not accurately represent the unique characteristic of resources. For example, the original MS processes were referred to as materials requirement planning (MRP). MRP is generally regarded as inadequate to meet current problems, primarily because MRP focused solely on the procedures for manufacturing a product and the timing associated with completion of the product.

One of the problems of MRP was that it was not very good at taking into account the limitations of resources. For example, MRP assumed an infinite capacity for each of the resources (e.g., work stations, tolls or people) available for use in the machining, assembly and production of a product. This assumption is simply not realistic. In reality, real resources have finite restrictions on capacity, operational capability, operational environment, etc. Thus, MRP generally ignored the operational constraints that limited how one could execute the manufacturing process.

Many manufacturing goals are difficult to accommodate in MS processes. For example, manufacturers sometimes strongly prefer that certain groups of products be produced by the same resource or resources in a particular sequential order. This is because there may be certain cost, operational or time advantages in doing so. The sequencing of production activities for different products in such a manner is generally referred to as "product wheels."

As described above, many of the MS systems currently available are at best ineffective because of the often complex nature of manufacturing facilities, the often conflicting goals concurrently sought by manufacturers, and the constraints typically associated with manufacturing resources. Further, because of the extremely tight timeline that many manufacturers face daily, a robust MS system and method capable of scheduling manufacturing processes in real time would be highly desirable. Further, such a system and method would be even more valuable if it can take into account, the conflicting manufacturing goals, the complex relations between resources, and the resource constraints typically associated with a manufacturing facility.

SUMMARY OF THE INVENTION

To resolve the problems cited above, the present invention provides, among other things, a system and methods for scheduling manufacturing resources. In general, the present invention provides for a system and methods that schedule manufacturing resources by defining available resources, generating production methods and routes, and selecting routes based on user-defined goals. Further, the present system may use production wheels, packing out and block scheduling methods to optimally schedule manufacturing resources.

In a preferred embodiment, manufacturing data such as customer and internal orders, resource data, production methods, resource calendars, user goals, product wheels, SKU data, and the like, is stored in a database or a plurality of databases. After receiving and storing orders, one of the orders is selected for scheduling. Each order has an objective associated with it that identifies, for example, the finish goods or work-in-process that is the goal of the order. An MS model is created and stored in the database by defining available resources. Resources available for use in manufacturing are defined by identifying the constraints associated with each of the resources. A production method is generated based on the objective associated with an order selected for scheduling and the constraints as defined by the MS model. The production method identifies the production steps needed to attain the objective. Based on the production method generated, one or more routes are generated. One of the generated routes is then selected for scheduling based on user defined scheduling and/or routing goals. At least five types of scheduling goals are possible: maximizing resource utilization, just-in-time, minimizing production cost, minimizing cycle time and balance resource utilization. At least three types of routing goals are possible: fast, best, and fast on time.

According to another embodiment, product wheels are created and employed to prevent undesirable transitions from occurring. A transition is the process that a resource or a plurality of resources must undergo between succeeding assignments. By employing product wheels, undesirable sequencing of assignments may be detected and/or avoided.

According to another embodiment of the present invention, excess work-in-process may be packed out. As a by-product of manufacturing processes, excess work-in-process may be generated. By monitoring for and identifying excess work-in-process, and identifying and scheduling stored orders that consumes the excess work-in-process, the excess work-in-process may be eliminated.

According to another embodiment, block scheduling may be employed to reserve one or more resources for a product family. Reserving a resource may be accomplished by creating block calendars that are associated with the resource. The block calendars are divided into time intervals and product families assigned to those periods to reserve the resource for the product families.

As will be readily appreciated by one of ordinary skill in the art, the present invention provides for a robust system and method for scheduling manufacturing resources. Additional features and advantages are set forth in the description that follows, and in part are apparent from the description, or may be learned by practice of the invention. The objectives and other advantages of the invention are realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 10B is a chart depicting an exemplary product wheel;

DETAILED DESCRIPTION OF THE PREFERRED EMBODIMENTS

Figure 1A:
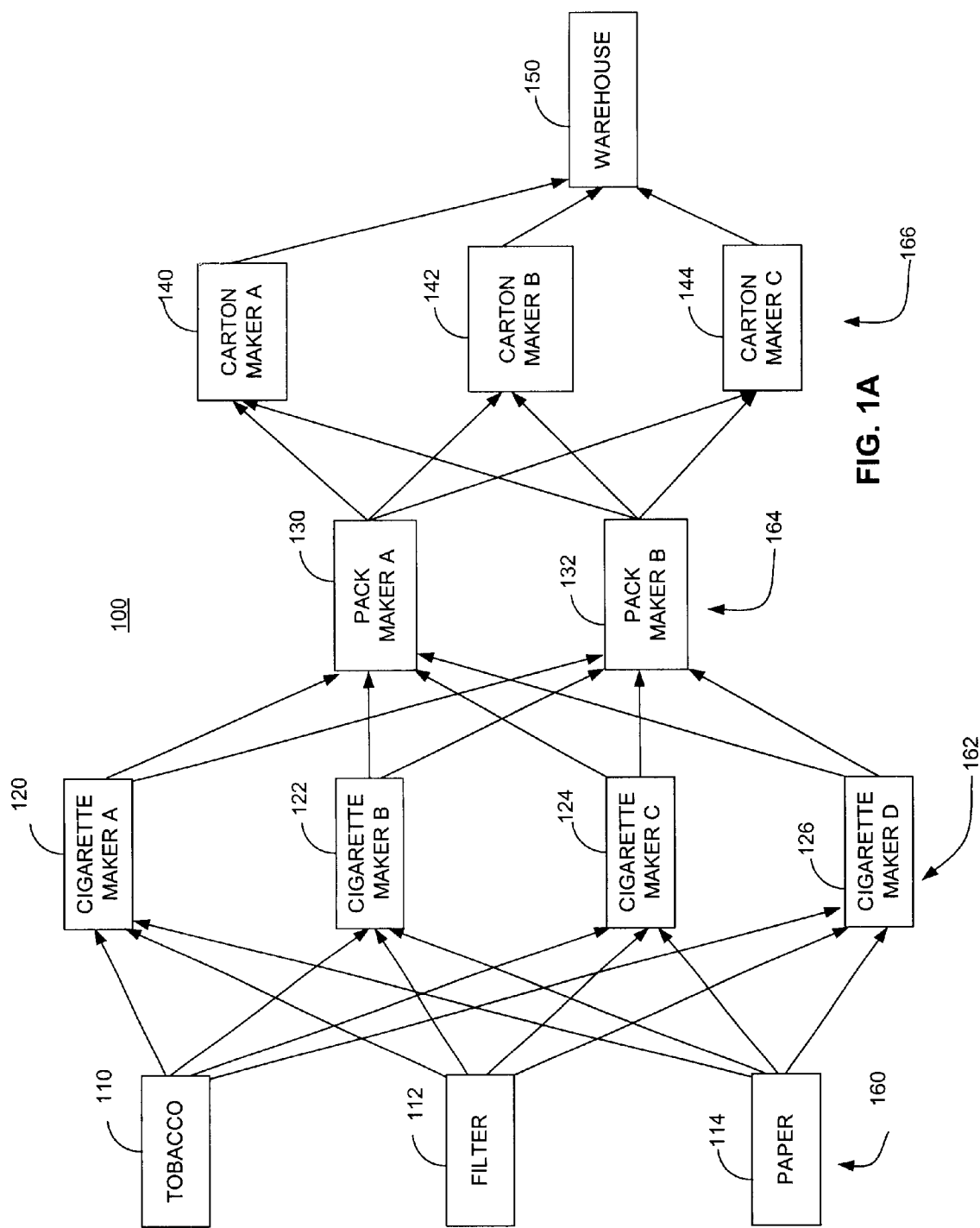
FIG. 1A is an exemplary manufacturing facility for manufacturing cigarette cartons.

To explain the novel features of this invention, the following example of an exemplary process for manufacturing cigarettes is provided. FIG. 1A illustrates the various routes that may be used for making and packaging cigarettes in an exemplary manufacturing facility.

The production of manufactured goods, such as cigarettes, is often initiated by an order from a customer. Such an order typically contains certain relevant information, for example, the item or items being ordered, the quantity and quality of the item or items, delivery location and the "need date." The need date is the date that the customer must or prefers to have the ordered item[s] delivered. Based on the information contained in the order, a manufacturer must carefully plan the manufacturing process that meets the requirements of that order.

The process for making and packaging cigarettes begins when tobacco 110, filter 112 and paper 114 are sent to one or more cigarette makers 120, 122, 124 and 126. The tobacco 110, filter 112 and paper 114 are non-reusable resources while cigarette makers 120, 122, 124 and 126 are reusable resources. Here, the tobacco, filter and paper resources 110, 112 and 114 are non-reusable resources because unless these resources are regularly replenished, the resources will eventually be depleted. On the other hand, the cigarette makers 120, 122, 124 and 126 are manufacturing equipment that is not replaced very often. After getting the raw materials (i.e., tobacco, paper and filter), the cigarette makers 120, 122, 124 and 126 makes cigarettes by rolling the tobacco 110 inside the paper 114 and inserting the filter 112 to the end of the rolled up tobacco and paper to produce cigarettes. Of course, all of the cigarette makers 120, 122, 124 and 126 may not be available for use at any given time. That is, several of the cigarette makers may be in use for other customer orders. For example, suppose in addition to the order for filtered cigarettes described above, there was a second order that was needed to be scheduled during the same time period, for example, a customer order for unfiltered cigarettes. In this situation, some of the cigarette makers 120, 122, 124 and 126 may be assigned to the second order, thus, making some of the cigarette makers unavailable for use in manufacturing filtered cigarette for the first order.

After the cigarettes are manufactured, they are sent to one or both cigarette pack makers 130 and 132. The cigarettes pack makers 130 and 132 place twenty individual cigarettes into a package creating a single cigarette pack. Once a cigarette pack is made, they are then sent to one or more carton makers 140, 142 and 144. The carton makers 140, 142 and 144 place twelve packs of cigarettes into a carton, seal the carton and then ship the carton out to a warehouse.

The arrows between the various resources in FIG. 1 are individual legs of different possible routes for turning raw materials (i.e., tobacco, paper and filters) into cartons of cigarettes. Note that although the number of resources depicted in FIG. 1 is relatively few, many different routes are possible. Thus, the variation and complexity of routes exponentially increases with the number of resources available.

Each route is generally associated with a unique combination of resources. Along any given route, only specific resources are utilized. For example, in one route for producing cigarette cartons, the following resources are utilized, tobacco 110, filter 112, paper 114, cigarette maker B 122, pack maker B 132, and carton maker C 144. Meanwhile, another route may utilize the following resources, tobacco 110, filter 112, paper 114, cigarette maker C 124, pack maker A 130, and carton maker A 140.

In addition to all the different route variations, manufacturers must should take into consideration "scheduling opportunities" when scheduling manufacturing resources in accordance with a customer order. A scheduling opportunity is the time slot or time interval when a particular resource is available for use. For example, suppose the manufacturing facility in our previous example is very busy. If a new customer order arrives that needs to be immediately satisfied, then the manufacturer must make sure that there are scheduling opportunities or open time slots available for each resource being used to meet the order. Thus, when a manufacturer creates a production plan (i.e., routing plan) for meeting a customer order, it should, in addition to planning the appropriate route, make sure that there are scheduling opportunities for all the resources needed for the planned route.

The process for making cigarettes illustrated above has been greatly simplified for explanatory purposes. That is, in reality, as more actual operating conditions are accounted for, the manufacturing plans quickly become much more complex. For example, many reusable resources, such as cigarette makers 120, 122, 124 and 126 may only be able to produce products in batches. If a batch of products being produced by a reusable resource (e.g., cigarette makers) is greater than a subsequent resource on the same route (e.g., pack maker), then the manufacturer must somehow account for the difference between succeeding resources. Further, manufacturers should also take into account the difference in job time requirements for resources along the same route. For example, suppose cigarette maker B 122 and pack maker A 130 are assigned to work together on the same route for a particular customer order. However, suppose the time it takes to make a pack of cigarette by the pack maker A 130 is much less than the amount of cigarettes being produce by cigarette maker B 122. In this situation, the manufacturer will have to decide whether to have the pack maker A 130 sit idle while waiting for cigarette maker B 122 to make enough cigarettes to make a pack or to run another customer order through the pack maker A 130 while the cigarette maker B 122 is making enough cigarettes to make a pack. As the above example illustrates, the planning of manufacturing products in a manufacturing facility is often complex, tedious and time consuming.

The resources depicted in FIG. 1A may be grouped into resource families or groups 160, 162, 164 and 166. Tobacco 110, filter 112 and paper 114 make up a nonreusable resource family (or group) 160 for raw materials. The cigarette makers 120, 122, 124 and 126 make up a reusable resource family 162 for cigarette making machines. The pack makers 130 and 132 make up a second reusable resource family (or group) 164, this one for cigarette pack making machines. Finally, the carton makers 140, 142 and 144 make up a third reusable resource family (or group) 166, this one for cigarette carton making machines. Note that each member of a family have common characteristics that are shared by all of the members of the family. Sometimes members of a family will perform the same type of function within the manufacturing plant. However, in other families, members may not perform the same functions. For example, for the nonreusable resource family for raw materials 160, the tobacco resource 110 will not be able to typically replace the filter resource 112.

Similarly, products or stock keeping units (herein "SKU") may also be grouped into product families. In our example, cigarettes may be divided into filtered or unfiltered cigarettes. The filtered cigarettes may then be sub-divided into subgroups, for example, menthol and non-menthol. Often, manufacturers prefer to manufacture products by manufacturing members of the same product family using the same resources and/or in a specific sequential order. Scheduling the production of a product family in such a manner is generally known as "campaigns" or "product wheels." Manufacturers often prefer using campaigns during production because there are certain advantages of producing products in such a way, for example, reduced manufacturing costs.

Figure 1B:
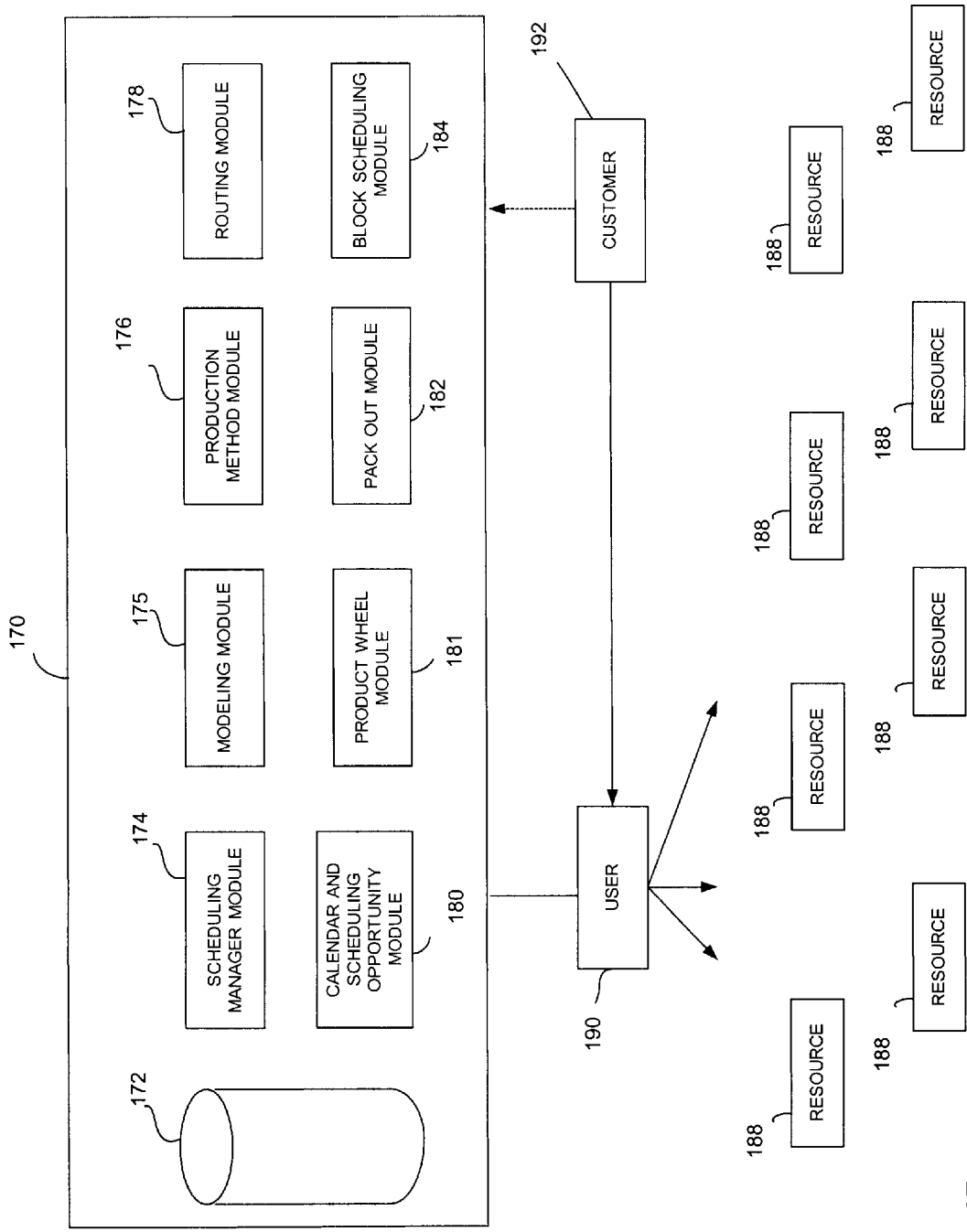
FIG. 1B is a block diagram depicting one embodiment of the system for scheduling manufacturing activities.

According to the present invention, there is provided a robust system and method for planning and scheduling manufacturing resources using a goal oriented scheduling process. FIG. 1B illustrates a system 170 according to one embodiment of the present invention. The system 170 may be embodied in, for example, a work station, a server, a network of computer devices, or the like. The system may be located at a manufacturing facility or may be remotely located away from the facility. The system 170 comprises a database 172 and several modules 174 to 184 (described below). Although the database 172 in FIG. 1B is depicted as being a single database 172, it could of course be several databases embodied in multiple servers or workstations. The database 172 may be used to store various data including a customer order, internally generated orders, models that define the resources available, production methods, resource attributes and constraints, resource calendars, user goals, product wheels, SKU data, and the like, all of which is described below. The data, stored in the database 172, may be imported from external software applications, such as a supply planning application. For example, the Networks Demand application by Manugistics, Inc.™ may supply relevant data to the system 170 to be stored and parse during the employment of the various system features. The user 190, who may be the manufacturer or any other entity or person responsible for managing the manufacturing facility, is electronically in communication with the system (for example by wireless or wire channels). A customer 192 may be in direct communication with the system 170 and/or in communication with the user 190. Thus, the customer 192 may place orders directly with the system 170 or through the user 190. Based on the customer order and user goals, the system 170 is able to schedule manufacturing resources 188 for production processes that fulfill the requirements of the customer order and user goals. The resources may be plant equipment, raw materials, work-in-process (herein "WIP"), man-hours, storage items, transportation items, or any other resources associated with a manufacturing facility.

The system 170, when used for scheduling the resources, employs various modules 174 to 184 individually or in combination. Briefly, a scheduling manager module 174 receives, organizes and distributes the various data stored in the data database 172. For example, the scheduling manager module 174 stores the orders received from customers 192 and may organize the orders in a particular order such as by need date or date received. Further, the scheduling manager module 174 identifies the scheduling and routing goals of the user 172 and stores/retrieves the goals in the database 172. Based on the scheduling and routing goals of user 172, the scheduling manager module 174 selects a route[s] for scheduling. Based on the selected route, the scheduling manager module 174 selects scheduling opportunities for each resource associated with the selected route. The scheduling manager module 174 may also monitor for excess SKUs (SKU may be finished goods or work-in-process) and schedule orders to consume the excess SKUs.

A modeling module 175 assists the user 190 in creating an MS model (herein "model") by defining the resources available for use. The resources may be defined by defining the various constraints associated with each of the resources. For example, attributes such as capacity, continuous or batch production capabilities, and any other attributes relevant to production processes may be used to define resources. Further, the modeling module 174 may also define SKUs, both finished goods and work-in-process, that may be present as a result of production activities. Attributes that may be assigned to the SKUs include, for example, whether the SKUs need to be packed out if excess SKUs exist and whether the SKUs are associated with any finished goods. A production method module 176 generates the production methods based on orders and resources available as identified by the model. Based on one of the production methods generated, and the user's scheduling and routing goals, a routing module 178 generates feasible route[s]. A calendar and scheduling opportunity module 180 creates and maintains calendars for each of the available resources defined in the model. A calendar, when used in association with a particular resource, is used to reserve or hold the resource for a particular assignment.

A product wheel module 181 creates and maintains product wheels. A product wheel is a set of one or more allowed product transitions associated with a given resource. The product wheel module 181 further prevents product wheels from being violated or at least alerts the user 190 that a wheel may be violated if a particular route is scheduled. This may be accomplished by reviewing routes and the scheduling opportunities selected by the scheduling manager 174 to determine whether they violate any product wheels. If a violation is detected, the scheduling manager 174 may cancel the selected route and scheduling opportunities or alert the user 190 that a product wheel is being violated by the selected route and scheduling opportunities.

A pack out module 182 monitors and detects any excess SKUs (for finished goods) or work-in-process (herein "WIP") that may exist and schedules orders that consumes the excess SKUs or WIPs. The block scheduling module 184 allows a user 190 to reserve resources to specific products or product families during specified time periods. The block scheduling module 184 can create block calendars and assign the calendars to a specific resource that the user wants dedicated to a particular product family. The functionality of the modules 174 to 184 described above may be best understood with the description of the following examples and processes.

Figure 2:
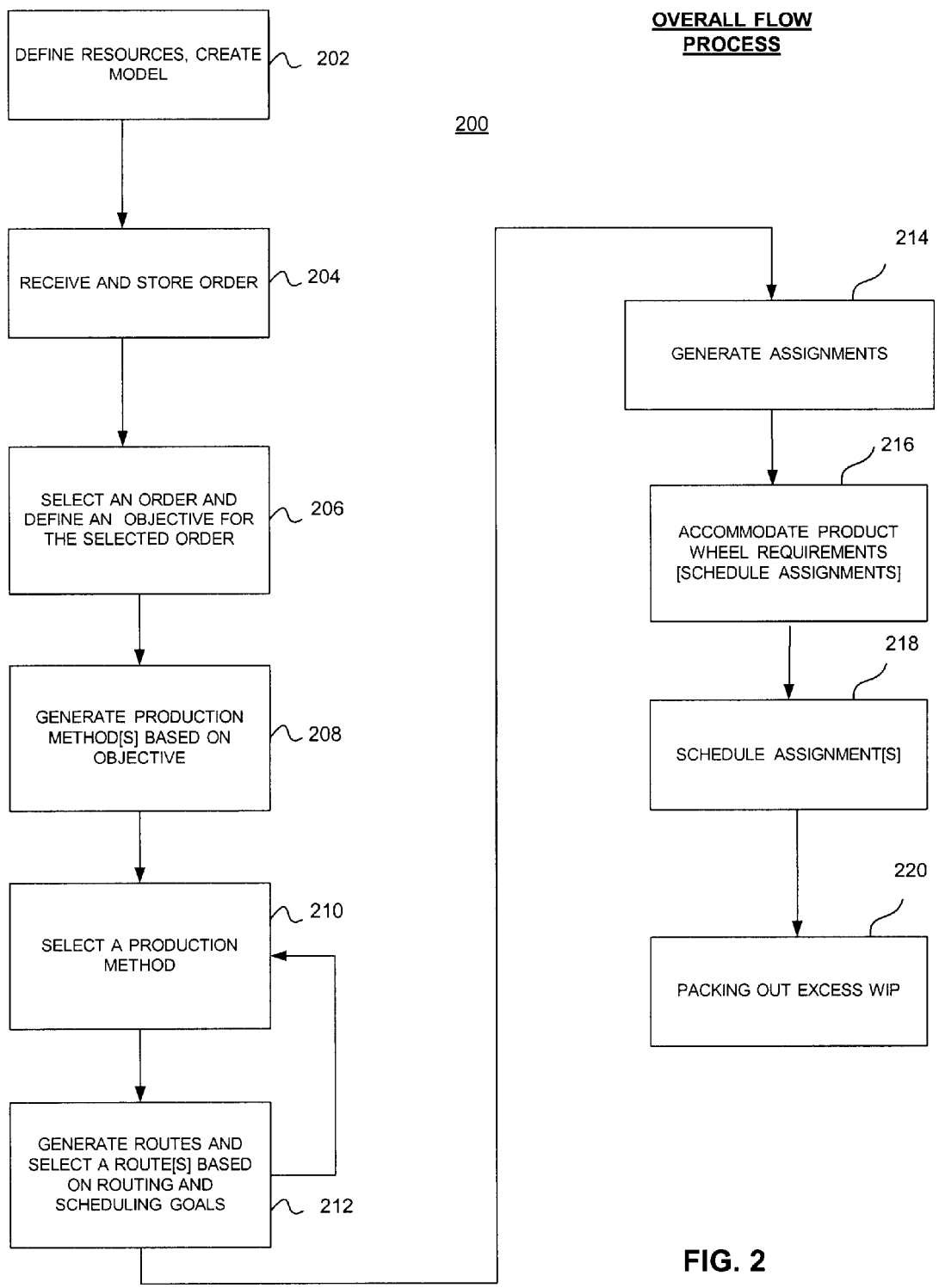
FIG. 2 is a flow diagram depicting the general steps for scheduling manufacturing resources.

Referring to FIG. 2 depicting a process, in accordance with one embodiment of the present invention, for scheduling manufacturing resources based on orders, in its most generic and high-level state. Orders may be customer or internally generated orders. Detailed description of the generic steps depicted in FIG. 2 are described in FIGS. 3 to 12.

The process flow 200 in FIG. 2 involves generic steps which are applicable to essentially any type of business or manufacturing organization. For example, the process 200 may be applied to chemical manufacturing, consumer goods production, industrial equipment manufacturing, and the like. Users of the present invention may be, for example, various types of manufacturers, entities, or persons involved in the planning and/or scheduling of resources used to satisfy or fulfill customer or internal orders. The present invention is a scheduling system and methods that may be applied to many types of businesses in many situations.

Generally, the process 200 begins when a model is created by defining the resources available at step 202. At step 204, an order is received and stored. At step 206, an order is selected and an objective defined based on the order. At step 208, one or more production methods are generated based on the objective selected in the previous step. At step 210, a production method is selected from the methods generated in step 208. At step 212, feasible routes are generated based on the method selected and a route is selected based on user goals. At step 214, assignments are generated according to the route selected in step 212. At step 216, the process determines if any product wheels have been violated and if so, adjusts route and/or method accordingly (product wheels are described below). At step 218, the assignments generated are scheduled. At step 220, the process packs out any excess work-in-process ("WIP") that may be generated by the planned route. Although not shown in FIG. 2, the system according to the present invention may also employ block scheduling. The steps described above will now be discussed in greater detail.

Preferably during the early stages of the process 200, a model is created by identifying and defining both reusable and nonreusable resources that are available for use as depicted in step 202. Resources that need to be identified include all of the resources available for use in any manufacturing activities contemplated by the system, for example, raw materials, individual reusable resources, and pooled reusable resources. Once the resources are identified, they must be defined. To define a resource, information related to the resource is provided such as the starting and ending SKUs being consumed or generated by the resource, the resource consumption and production rates, which family the resource belongs to, and any other constraints associated with that resource. Defining a resource also generally requires that the resource's relationship with other resources be defined. For instance, suppose pack maker B 132 is only able to physically accept the output from cigarette maker C 124 or cigarette maker D 126 because there is no assembly line connecting the pack maker B 132 to the other cigarette makers 120 and 122. In such a situation, the pack maker B's limitations must clearly be defined in the model. Other resource constraints should also be identified, such as, whether a reusable resource's output is continuous or is incremental. That is, whether a reusable resource produces finished goods or WIPs continuously or whether it produces finished goods or WIPs in batches. For example, the cigarette makers 120, 122, 124 and 126 may only produce cigarettes in increments of forty cigarettes per batch.

Each resource is typically associated with a calendar. The calendar is used for scheduling individual activities related to specific orders. Activities are the series of specific process actions or steps required for producing the finished goods or WIPs sought by a specific order. The calendars may be divided into time slots. Each time slot may accommodate an order activity. The calendar may be customized so that it may be compatible with its associated resource. For example, the production capacity of pack makers 130 and 132 may be extremely high so that a calendar associated with one of the pack makers may be divided into small time slots, for example, 15-minute time intervals. This allows the pack makers 130 and 132 to be scheduled for many activities associated with many different orders during short time periods. On the other hand, calendars of resources having lower production capacity may be divided into longer time slots, for example, 60 minutes.

The process of scheduling an order generally begins when an order is received and stored in, for example, a database at step 204. The order may originate from any source, for example, it may be a customer order or an order generated internally. The database may be remotely located in a standalone server or may be located in the same server where the system is located. The orders stored in the database may be organized in a number of different ways. For example, they may be stored according to the time and date that they were received or by clients or by the type of items being ordered.

According to one embodiment of the present invention, information related to the order information such as quantity and quality of goods and need date may all be stored. In addition, other information related to the order may be stored. For example, the type of WIPs that may be consumed during the manufacturing process called for by the order may also be defined and stored. This information may be used to execute the "packing out excess work-in-process" feature (described below) that may be incorporated into the system.

After orders are stored, the system selects an order and defines an objective for that order at step 206. How the system selects an order among the plurality of orders that may be stored is accomplished by various means depending on user preferences. For example, if the orders stored are organized according to received date then the order having the earliest received date may be selected first. Once an order has been selected, the objective for that order is defined. Typically the objective will be the desired results of the order. For example, for most product manufacturers, this would be a defined quantity and quality of Supply Keeping Units (herein "SKUs") to be delivered by a certain date (i.e., Need date).

After the objective is defined, a production method or methods that meet the objective are generated at step 208. A production method specifies the specific process steps needed to meet the objective. A production method will also identify the resources and/or resource groups (i.e., families) used for the method. The selection of resources and/or resource groups to be employed for the production method is based on the characteristics and constraints associated with each resource that was defined in step 202. To illustrate how a production method may be generated, the following example is provided.

Figure 3A:
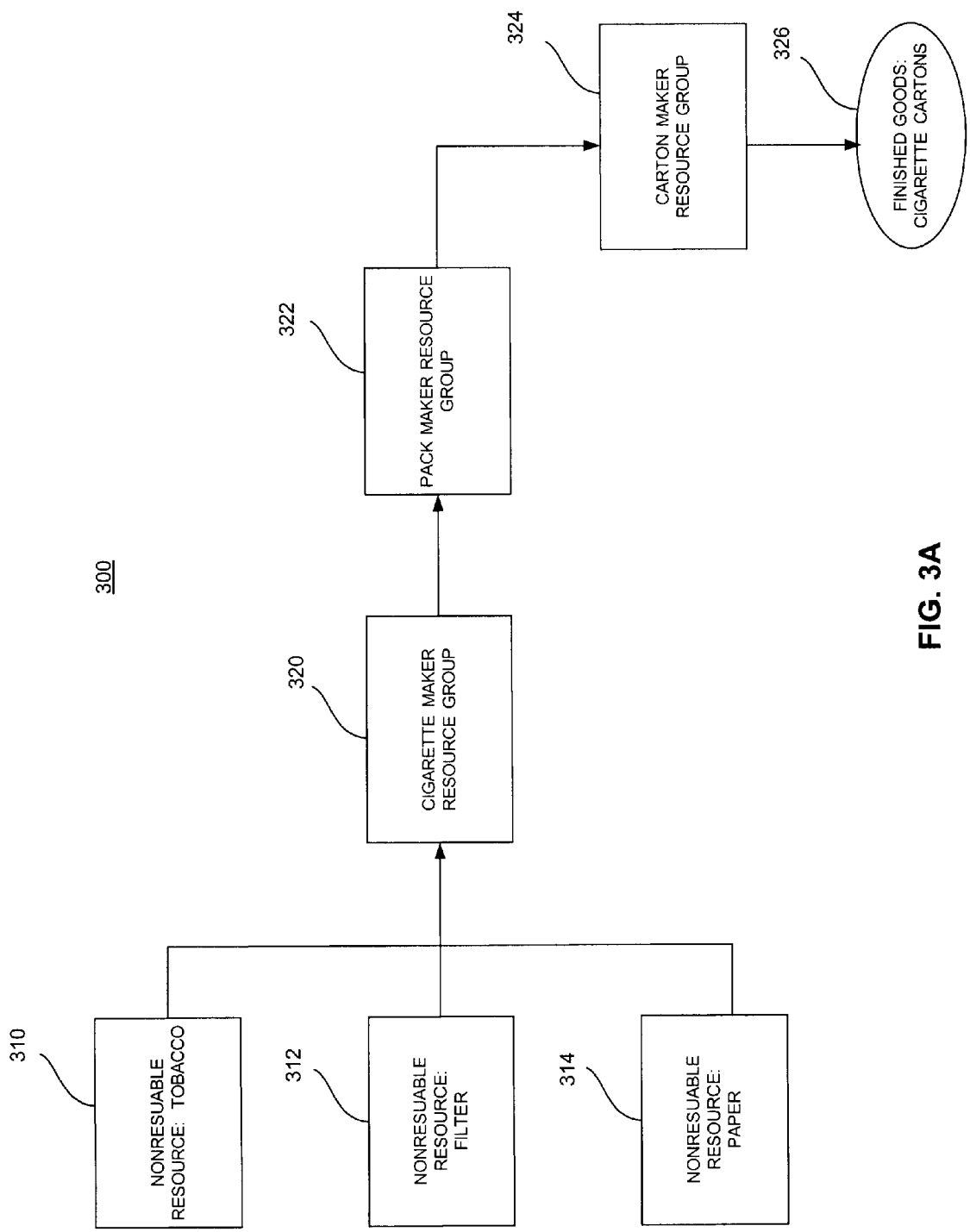
FIG. 3A is a flow diagram of an exemplary production method for manufacturing cartons of filtered cigarettes.

Referring to FIG. 3A depicting a production method 300 for making cartons of filtered cigarettes. This production method 300 meets the objective of an order. For purposes of this example, assume that the only objective here is to produce a carton of cigarettes (in reality, an order would be typically associated with a number of other objectives, for example, need date, delivery location, and the like). In the production method 300 depicted, the method 300 begins with three nonreusable resources, tobacco 310, filter 312 and paper 314, being fed into a cigarette maker resource group 320. The cigarette maker resource group 320 actually represents a production step for manufacturing cigarettes. In this case, the cigarette maker resource group 320 represents the step of making cigarettes. The cigarette makers resource group 320 is comprised of the individual cigarette makers 120, 122, 124 and 124 depicted in FIG. 1. The cigarette maker resource group 320 converts the raw materials (e.g., tobacco, filter and paper) into cigarettes, which are then sent to a pack maker resource group 322. The pack maker resource group 322 represents the production step for manufacturing cigarette packs. The pack maker resource group 322 comprises of pack makers 130 and 132 of FIG. 1. The cigarette packs produced by the resource group for pack makers 322 is then sent to a carton maker resource group 324. In this model, the resource group for carton maker 324 represents the production step for manufacturing cartons of cigarettes. The carton maker resource group 324 places the cigarette packs into a carton and seals the carton producing the finished goods, a carton of cigarettes 326. Note that rather than defining specific resources, resource groups were instead used to define each step of this production method 300. This allows greater flexibility when production routes (discussed below) are eventually generated because routes will not be restricted to using only a specific resource or resources for specific production steps. By relating each of the production steps to resource groups rather than to specific resources, the production method 300 allows greater flexibility when specific routes are eventually generated. Using resource groups rather than specific resources for specific production steps makes it possible to generate greater route variations. For example, in the above example, any of the resources or a set of resources belonging to the cigarette maker resource group 320 (which comprises of cigarette maker A, cigarette maker B, cigarette maker C and cigarette maker D) could have been used for the step of making cigarettes. Similarly, there is greater flexibility in generating routes by using a pack maker resource group 322 instead of using a specific pack maker for the step of making a pack of cigarettes.

The simplified production method 300 described above would, in actuality, also include many constraints that may exist in an actual manufacturing facility. For example, in the above method, we assume that each of the resource groups depicted produce and consume SKUs at the same rate so that all of the SKUs produced by a preceding resource group is immediately consumed by the succeeding resource group. It is assumed in the above example that the pack maker resource group 322 consumes all of the cigarettes produced by the cigarette maker resource group 320. However, rather than consuming cigarettes on a continuous basis, suppose the pack maker resource group 322 will only consume cigarettes in batches. Thus, the pack maker resource group 322 only accepts cigarettes when enough is produced by the cigarette maker resource group 320 to make a batch. In reality, such a situation may be easily resolved by, for example, simply slowing down the production line or setting aside a place or space between the cigarette maker resource group 320 and pack maker resource group 322 to accumulate cigarettes. However, to make allowances for such discrepancies is somewhat more difficult when generating a production method. One way to deal with such discrepancies is to create a constructive resource for holding SKUs.

Figure 3B:
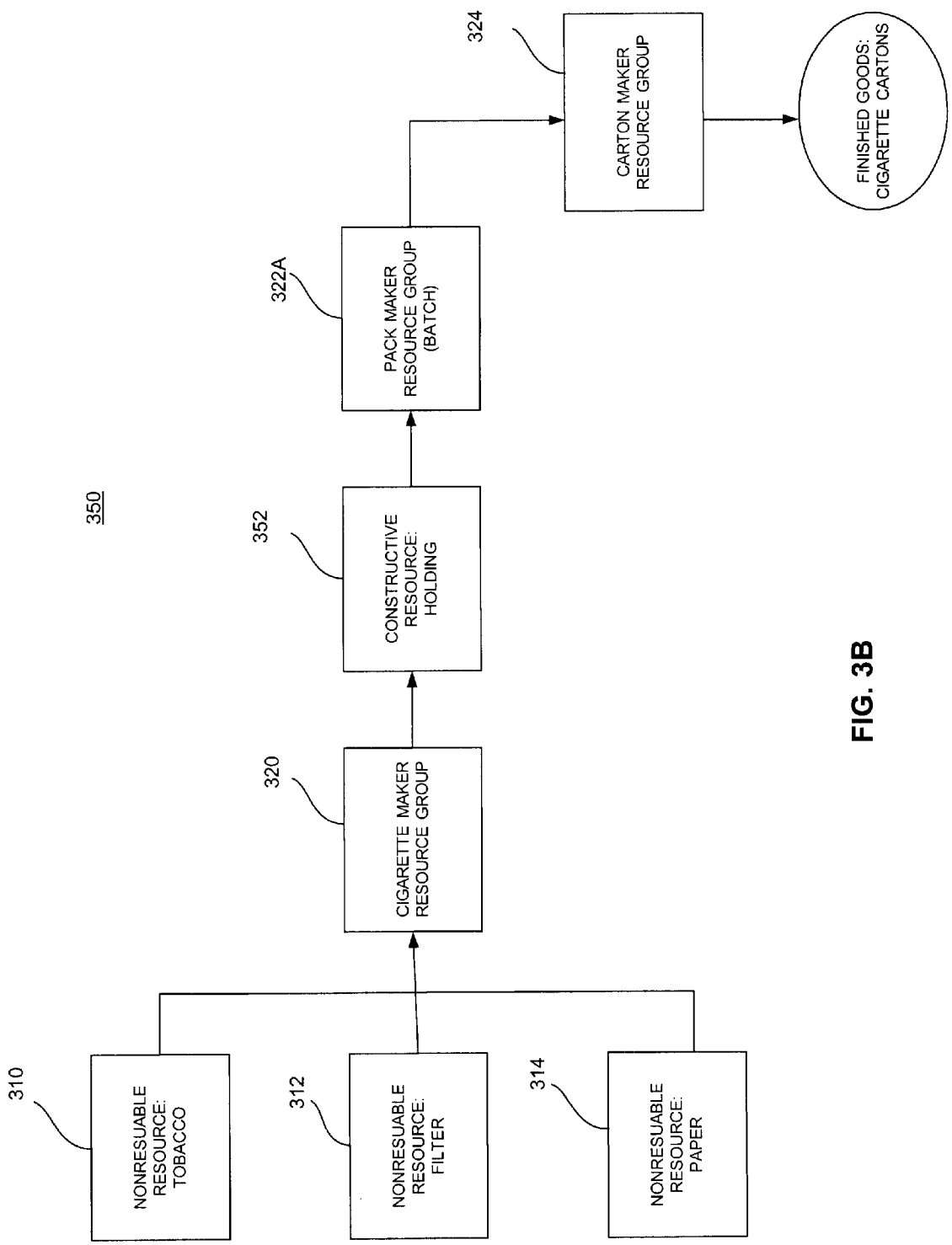
FIG. 3B is a flow diagram of a second exemplary production method for manufacturing cartons of filtered cigarettes.

FIG. 3B illustrates another production method 350. The production method 350 is similar to the production method 300 illustrated in FIG. 3A except that the pack maker resource group 322A has been further defined as a "batch" pack maker resource group 322 and a constructive resource called a "holding" resource 352 is added between the cigarette maker resource group 320 and the pack maker resource group 322A. To prevent the pack makers 130 and 132 from being able to consume anything other than batches, the pack makers 130 and 132 need to be further defined as batch consumers and producers, for example, in step 202 (FIG. 2). This may be accomplished by creating attributes associated with each resource that defines whether each of the resources defined produce and/or consume batches of SKUs or WIPs. Further, batch size and batch production rate of SKUs or WIPs being consumed or produced must be defined for that resource.

As described above, several production methods may be generated for each objective. That is, there may be several ways to achieve the same results. The various methods generated will typically have drawbacks and/or advantages over other methods for achieving the same results. The method or methods that will be the most appropriate for a specific objective may depend on other factors, for example, user preferences.

Once production methods have been generated, one of the methods is selected for purposes of determining a feasible route at step 210. The selection of a method may be made manually by the user, or alternatively, the system may select a method based on user-defined rules. For example, the user may create a user-defined rule that may require the system to select a method based on a preference for low cost or use of the least amount of resources, or any other user preferences.

Figure 4:
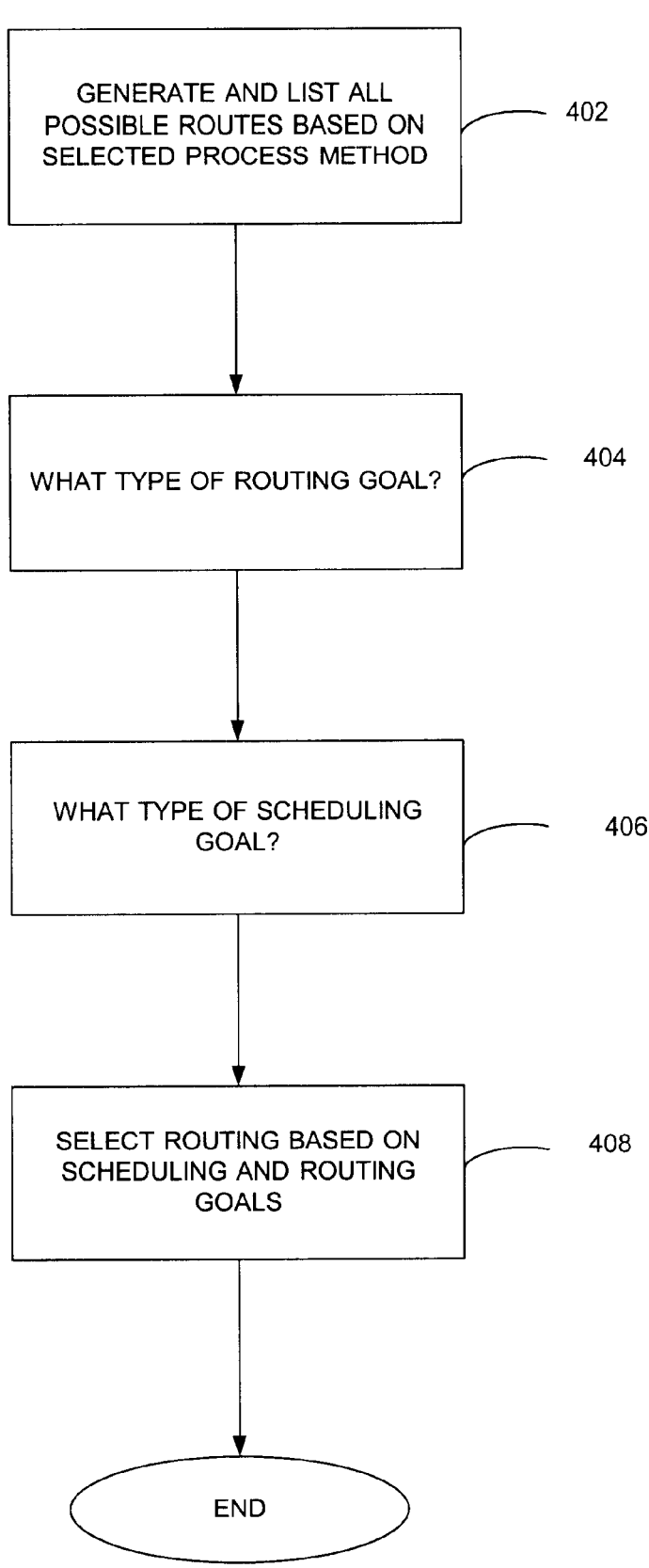
FIG. 4 is a flow diagram for reviewing and selecting a feasible route or routes.

FIG. 4, depicts a somewhat more detailed process 400 for reviewing and selecting a feasible route or routes as depicted in step 212 of FIG. 2. Initially at step 402, the system generates and lists all possible routes that satisfy the production method selected at step 210. In one embodiment, the system uses, in combination, two types of goals to select the best route. The two types of goals are scheduling goals and routing goals (described in greater detail below). At step 404 the system selects a routing goal based on user preferences. There are three types of routing goals, "fast", "best" and "fast on time". When "fast" is selected as the routing goal, the system selects the first route that is feasible. When "best" is selected as the routing goal, the system selects the route that best achieves the scheduling goal (see below). Under "best," the system will generally take longer to select a route than when the goal is set at "fast." When "fast on time" is selected as the routing goal, a blend of best and fast goals described above are sought. If this routing goal is selected, then the system checks the minimum number of routes necessary when determining which route will make the order on time. This is the goal that the user may select if the user wants to achieve a balance between using the best but most timely choice. At step 406 the system determines what type of scheduling goal is desired by the user.

In one embodiment of the process, there are five types of scheduling goals: maximizing resource utilization, just-in-time, minimize production cost, minimize cycle time and balance resource utilization (details of each type of scheduling goals is described below). Based on the combination of scheduling and routing goals selected by the user, the system selects a route at step 408.

The specific route[s] selected is based on the combination of specific scheduling goals and routing goals selected. However, not all of the routing goals (i.e., fast, best and fast on time) are applicable to each of the five possible scheduling goals. For example, as will be discussed below, the routing goal selected will not be relevant if the scheduling goal is balance resource utilization. FIGS. 5 to 9 depict the detailed flow process 500 for selecting a route (as generally depicted in step 212 of FIG. 2) based on the scheduling goals selected working in combination with the routing goals selected.

Figure 5:
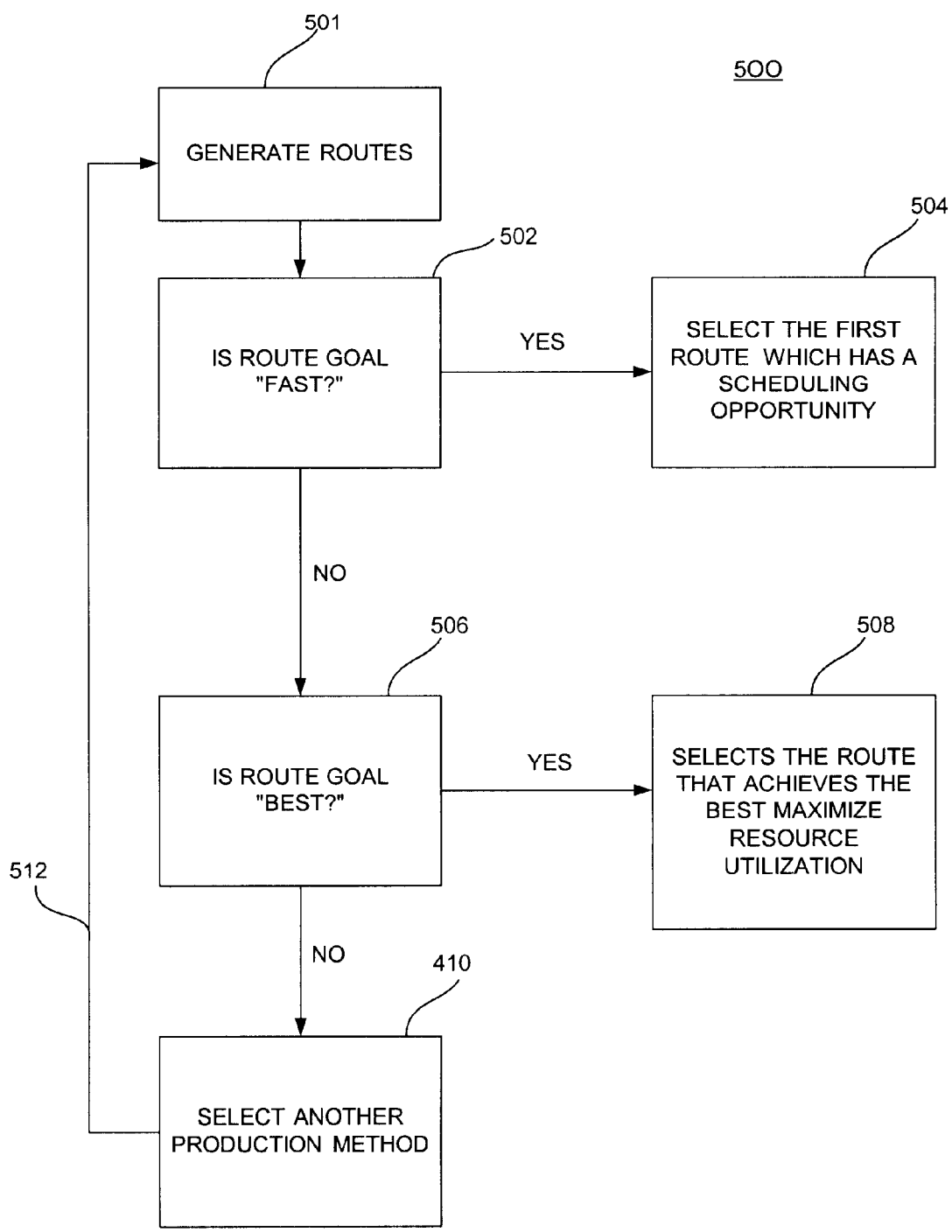
FIG. 5 is a flow diagram for selecting a route when the scheduling goal is maximizing resource utilization.

FIG. 5 illustrates the flow process 500 for selecting a route when the scheduling goal has been set at maximizing resource utilization. At step 501 the system generates routes based on the production method selected. At step 502 determine whether the route goal is "fast." If so, then the system selects the first route that has a scheduling opportunity at step 504. Otherwise the system determines whether the routing goal is set at best at step 506. If so, then the system selects the route that achieves the best route that maximizes resource utilization at step 508. If there is a tie between two routes that are best at maximizing resource utilization then the route with the earliest scheduling opportunity is selected. If the route goal is not "best" then the system selects another production method at 510 (as generally described in step 210 in FIG. 2) and the process of generating and selecting a route[s] begins again as indicated at 512.

Figure 6:
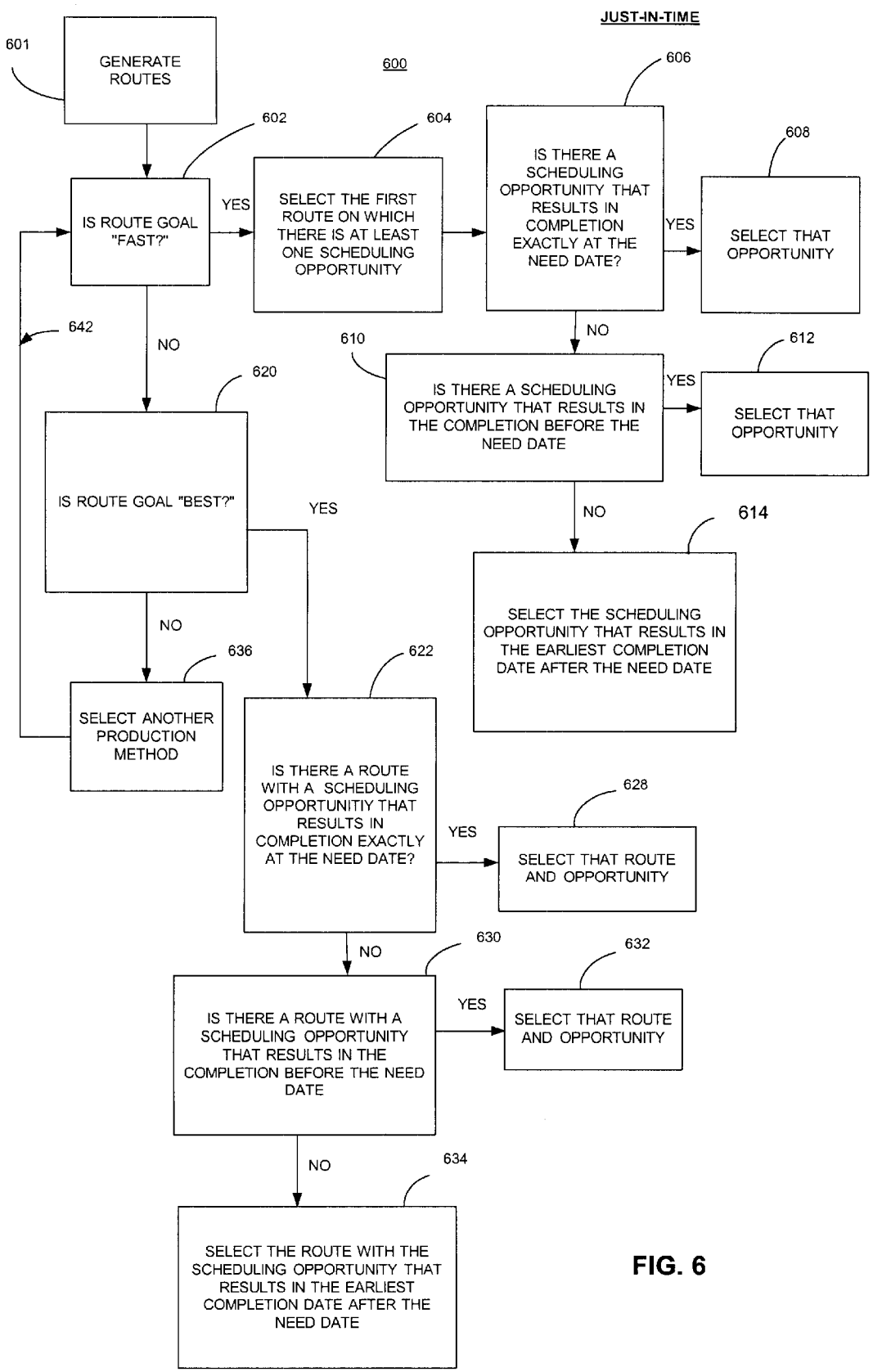
FIG. 6 is a flow diagram for selecting a route when the scheduling goal is just-in-time.

FIG. 6 depicts a detailed flow process 600 for selecting a route when the scheduling goal has been set at Just-In-Time. At step 601 the system generates routes based on the production method selected. At step 602, determine whether the route goal is set at fast. If so, then select the first route having at least one scheduling opportunity at step 604. At step 606, the system determines whether there is a scheduling opportunity that results in completion exactly on the need date. If so, then the system selects that opportunity at step 608. If not, then the system checks to see if there is a scheduling opportunity that results in completion before the need date at step 610. If so, then the system selects that scheduling opportunity at step 612. If not, then the system selects the scheduling opportunity that results in the earliest completion date after the need date at step 614. If, on the other hand, the routing goal is not set at "fast" then the system determines whether the routing goal is set at "best" at step 620. If so, then the system determines whether there is a route with a scheduling opportunity that results in completion at the need date exactly at step 622. If so, then the system selects that route and scheduling opportunity at step 628. If not, then the system determines whether there is a route with a scheduling opportunity that results in completion before the need date at step 630. If so, then the system selects that route and opportunity at step 632. If not, then the system selects the route with the scheduling opportunity that results in the earliest completion date after the need date at step 634. If the route goal is neither set at fast or best, then the system selects another production method at step 636 (as generally described in step 210 in FIG. 2) and the process of generating and selecting a route[s] starts over again as indicated by 642.

Figure 7:
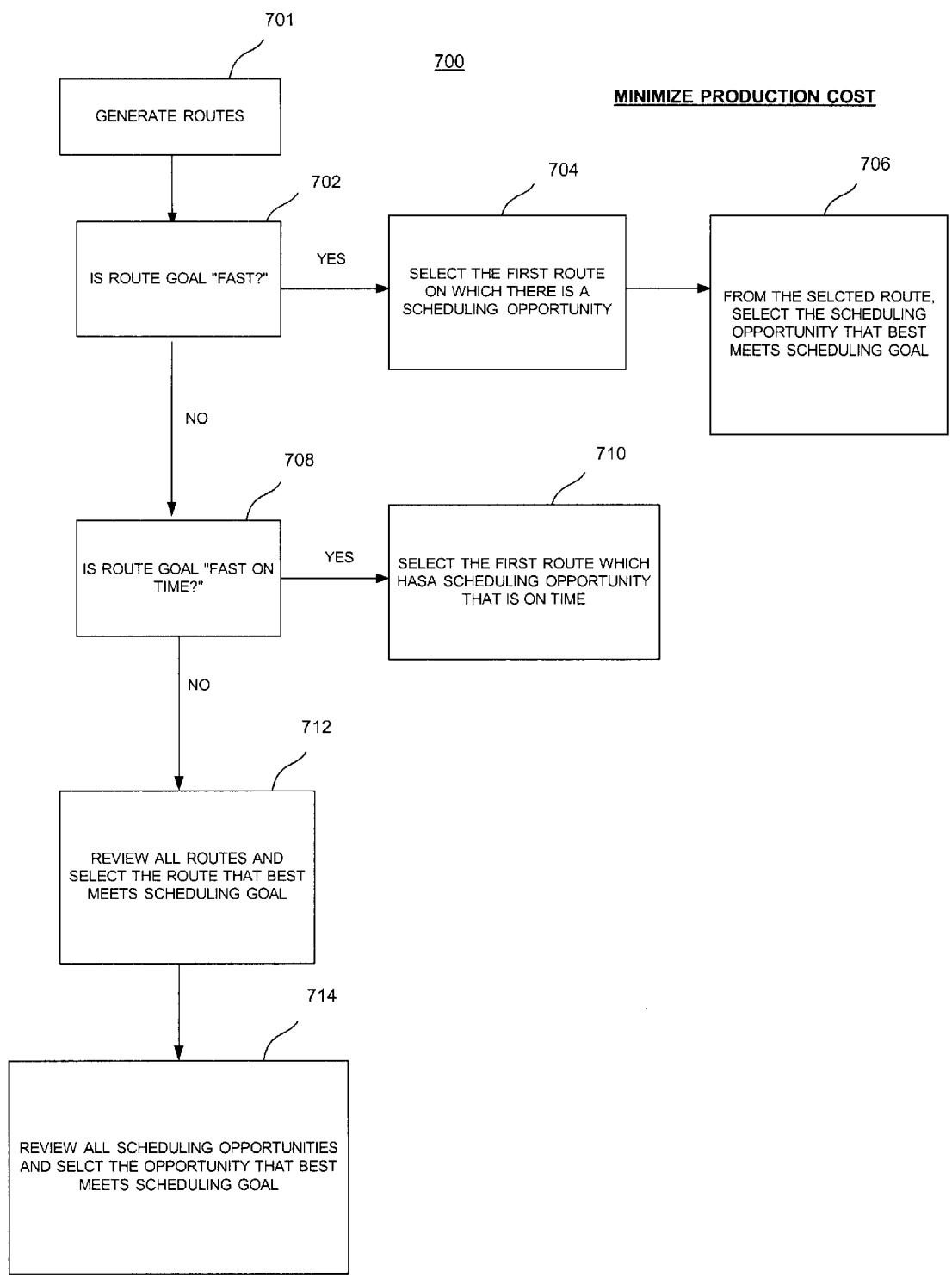
FIG. 7 is a flow diagram for selecting a route when the scheduling goal is minimizing production costs.

FIG. 7 depicts a detailed flow process 700 for selecting a route when the scheduling goal has been set at minimize production cost. At step 701, generate routes based on the production method selected. At step 702, the system determines whether the route goal is set at "fast." If so, then the system selects the first route on which there is a scheduling opportunity at step 704. At step 706, the system selects, from the selected first route, the scheduling opportunity that best meets the scheduling goal of minimizing production cost. If the route goal is not set at "fast" then the system determines whether the route goal is set at "fast on time" at step 708. If so, then the system selects the first route that has a scheduling opportunity that is on time at step 710. If not, then the system reviews all routes and selects the route that best meets the scheduling goal of minimizing production costs at step 712. At step 714, the system reviews all scheduling opportunities for the route selected at step 712 and selects the opportunity that best meets the scheduling goal of minimizing production cost.

Figure 8:
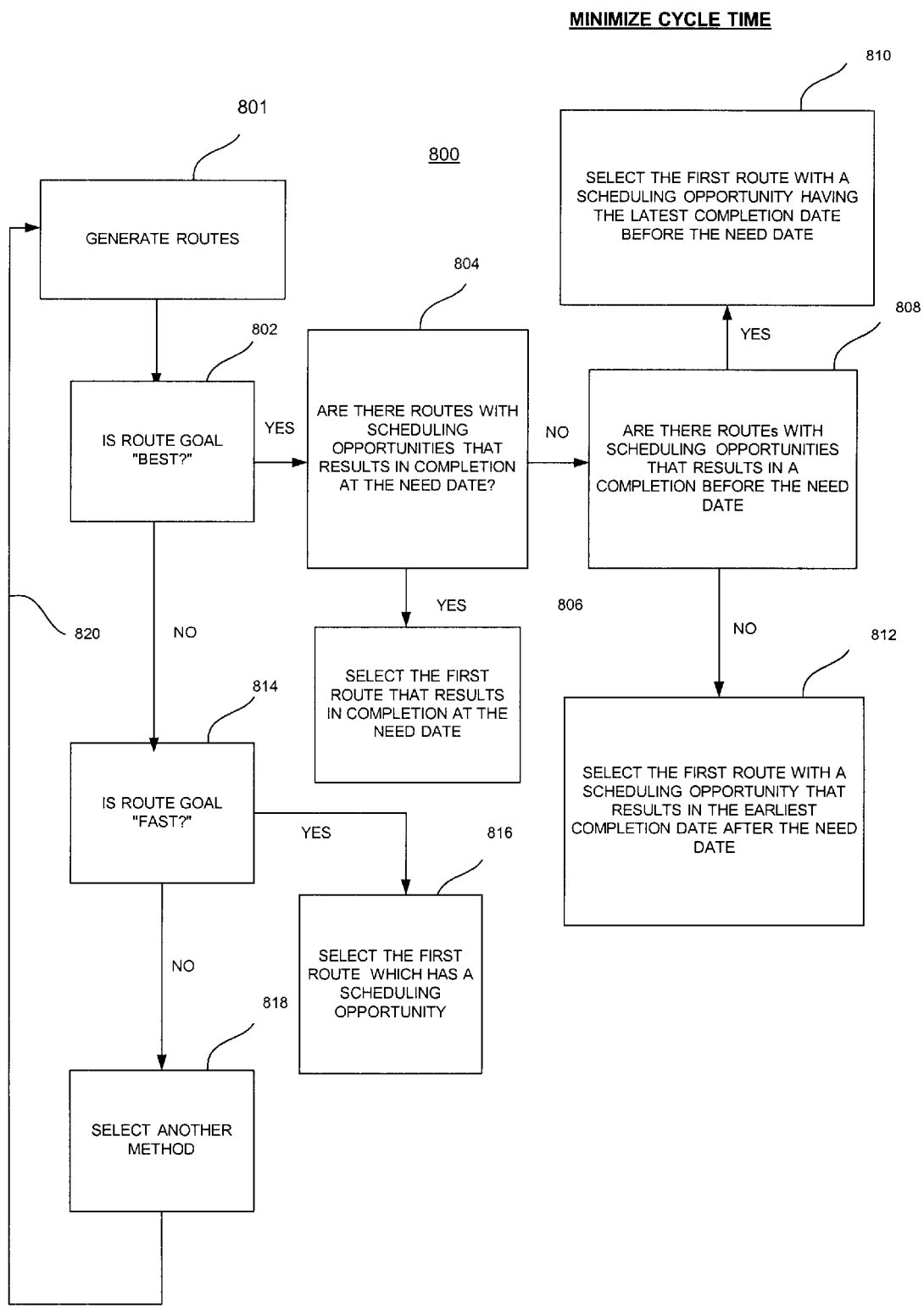
FIG. 8 is a flow diagram for selecting a route when the scheduling goal is minimizing cycle time.

FIG. 8 depicts a flow process 800 for selecting a route when the scheduling goal has been set at minimize cycle time. At step 801, the system generates routes. At step 802, the system determines whether the route goal is set at "best." If so, the system determines whether there are routes with scheduling opportunities that results in completion exactly on the need date at step 804. If so, then select the first route that results in completion on the need date at step 806. If not, then the system determines whether there are routes with a scheduling opportunity that results in a completion before the need date at step 808. If so, then the system selects the first route having a scheduling opportunity with the latest completion date before the need date at step 810. If not, the system selects the first route with a scheduling opportunity that results in the earliest completion date after the need date at step 812. If, on the other hand, the route goal is not set at "best" then the system determines whether the route goal is set at "fast" at step 814. If so, then the system selects the first route, which has a scheduling opportunity at step 816. Otherwise, the system selects another method at step 818 (as generally indicated in step 210 of FIG. 2) and the process for generating and selecting a route starts over again as indicated at 820.

Figure 9:
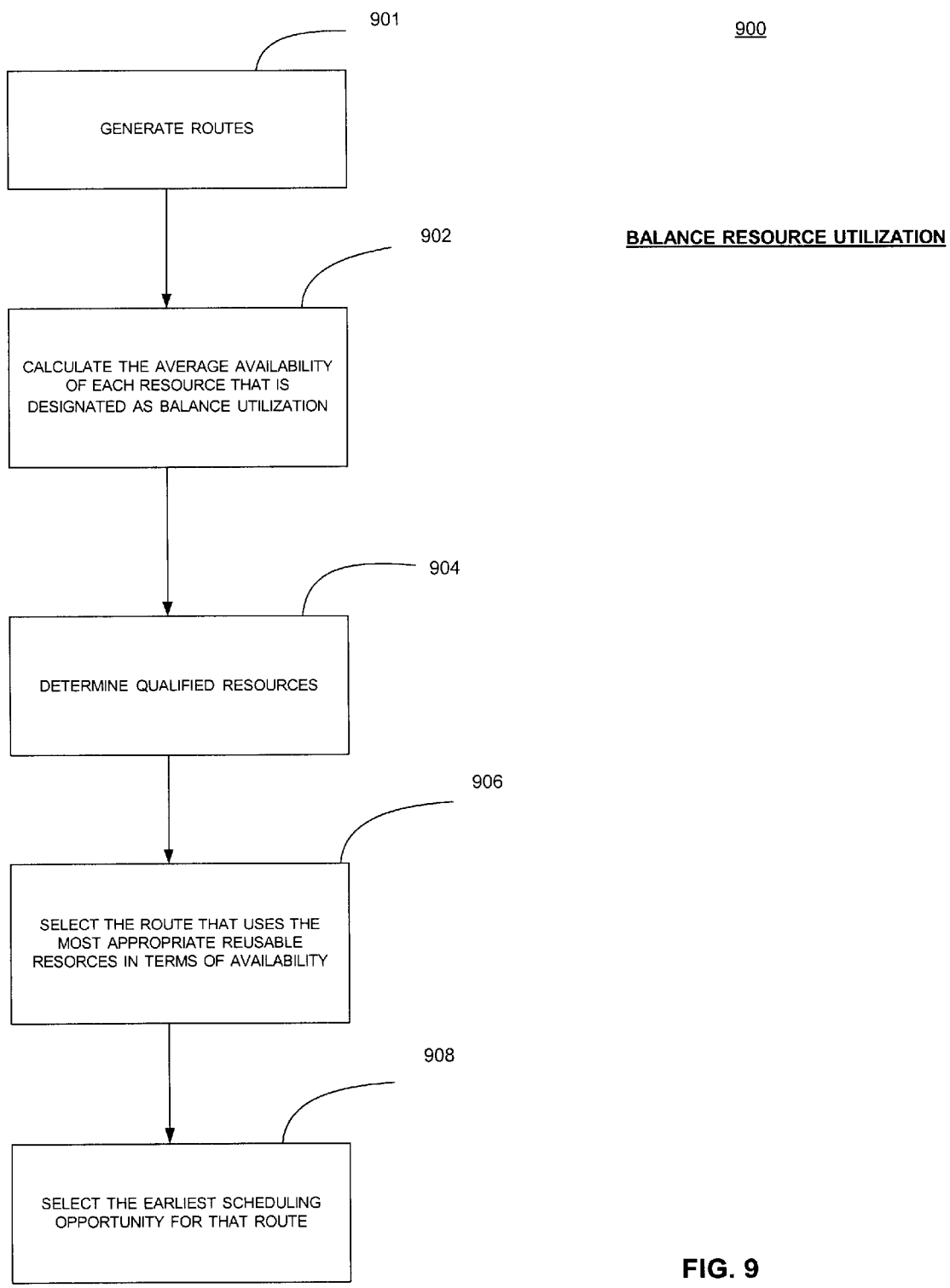
FIG. 9 is a flow diagram for selecting a route when the scheduling goal is balance resource utilization.

FIG. 9 depicts a flow process 900 for selecting a route when the scheduling goal has been set at balance resource utilization. The aim of the balance resource utilization scheduling goal is to select the route that uses the most appropriate reusable resources in terms of availability and uses the earliest scheduling opportunity in that route. At step 901, the system generates routes based on the method selected at step 210. At step 902, the system calculates the average availability of each resource that is designated as balance utilization. Typically a resource may be designated as a balance utilization resource when the resource is defined. The availability of each resource designated as balance utilization may be accomplished by reviewing the calendars of each resource and determining the availability of each resource based on scheduling opportunities as indicated on the calendars. The average availability could be an average based on different time intervals such as an average over a period of a day, a week, a month or any other user defined time interval. At step 904, the system determines qualified resources. Qualified resources are those resources designated as balance utilization needed to achieve the objective using the method selected in step 210 (see FIG. 2). At step 906, the system selects the route that uses the most appropriate reusable resources in terms of availability. At step 908, the system selects the earliest scheduling opportunity for that route.

Each production method generated in step 208 (FIG. 2) may require that more than one route be used to accomplish the objective. For example, suppose that a large customer was placed in our earlier example of the cigarette manufacturing facility. Suppose further that no single route will be able to manufacture enough cigarette cartons to fulfill the order by the need date. In such a situation, the production method selected may require that two or more routes be used to fulfill the order. Thus, the five processes described above for selecting routes based on different scheduling and routing goals may be employed multiple times for a specific method. Once the process for selecting a route and scheduling opportunities has been completed, a planned route[s] is generated. The planned route[s] will not only define the specific route[s] required for achieving the objective, but will also define the specific scheduling opportunities for each targeted resources being used for achieving the objective.

Referring back to FIG. 2, based on the selected route, assignments are generated for each resource targeted for use according to the selected route at step 214. An assignment is an order or a reservation for a specific resource reserving the resource for use during a specified time period (i.e., time slot). In a preferred embodiment, the system will review the assignments to determine whether any "product wheels" are being violated at step 216. A product wheel is a constraint placed on specific resources preventing or at least warning the user that an undesirable "transition" is being scheduled. A transition is the process that a resource must undertake between succeeding assignments. For example, manufacturing equipment must typically undergo certain modifications when the type of products being produced by the equipment is switched. The cost and time needed to undergo these transitions is typically unwelcome. However, the impact of transitions may be minimized by carefully selecting the sequence of products being produced by a particular resource. Thus, some companies prefer to schedule product families in "campaigns." which are preferred sequences of products scheduled over a set period of time. For example, a company may want to schedule a product family of SKUs of a particular grade or color, followed by a different product family.

"Product wheels" are a particular kind of sequencing problem in which orders for products must follow a prescribed set of transitions from product to product within a group of resources. The preferred or allowable transitions from one SKU to another on a resource may be important factors in a good schedule.

To illustrate the problem of product wheels, the following example is provided. Suppose an oil production manufacturer produces different kinds of oil. The oils are differentiated by their viscosities or grades. To manufacture the different grades of oil, the manufacturer uses an additive in its oil, that, when added in different percentages, create oils of differing grades. To optimize its manufacturing facility, the manufacturer prefers that certain machines transition from making one grade to another. Depending on the grades being produced, it can be time-consuming (and therefore more expensive) to switch a machine from making one grade of oil to another, because the machine may require cleaning during transition. The more the grades differ, the more cleaning is required.

Figure 10A:
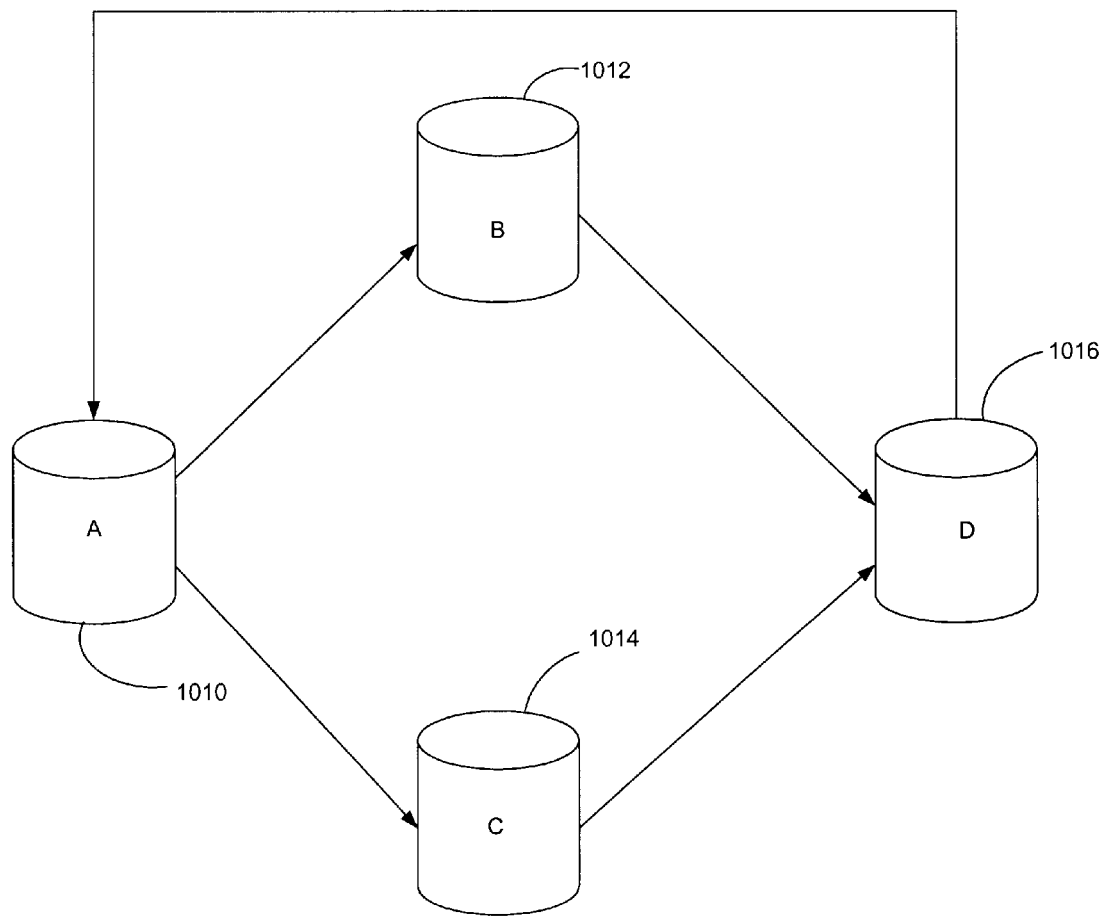
FIG. 10A is a block diagram depicting exemplary transitions allowed for four grades of oil.

To illustrate the point, we refer to FIG. 10A showing four grades of oil and the transitions that are allowed when scheduling an oil mixer (not shown) that manufactures the different grades of oil. In this illustration, the oil mixer may produce oil of various grades, A, B, C and D 1010, 1012, 1014 and 1016. The mixer may transition from producing grade A oil 1010 to either grade B oil 1012 or grade C oil 1014. The mixer may then transition from producing grade B or C oil 1012 and 1014 to a grade D oil 1016. Finally, the mixer may transition from producing grade D oil 1016 to grade A oil 1010. A product wheel that would constrain the oil mixer in a manner described above would constrain all of the transitions illustrated above.

To illustrate how a product wheel may constrain a particular resource, we now refer to FIG. 10B. FIG. 10B depicts a chart 1020 that shows the various transitions of an exemplary product wheel associated with the transitions allowed for an oil mixer illustrated in FIG. 10A. Rows 1030 to 1038 are the transitions that make up a product wheel called "Oil Mixer 1." Row 1040 is a transition for another product wheel associated with another resource called "Packager 1." These transitions in rows 1030 to 1038 are called allowed or permitted transitions. Thus, each transition is associated with a particular product wheel as indicated in column 1050 (in this case either Oil Mixer 1 or Packager 1). The SKUs shown in column 1052 are the initial SKUs being manufactured by the oil mixer prior to transition, and the SKUs shown in column 1054 are the ending SKUs after transition. Thus, the product wheel "oil mixer 1" will only permit those transitions listed in the chart 1020 of FIG. 10B.

Other constraints may also be included in a product wheel. For example, a cost constraint, as indicated in column 1056, prevents oil mixer 1 from exceeding certain costs for certain transitions. In row 30, the transition from oil grade A to oil grade B for oil mixer 1 is limited to the cost of $30.00. Each product wheel may be assigned to one or more resource. Although a product wheel may be assigned to more than one resource, a resource may only be associated with one product wheel at any given time.

Figure 11:
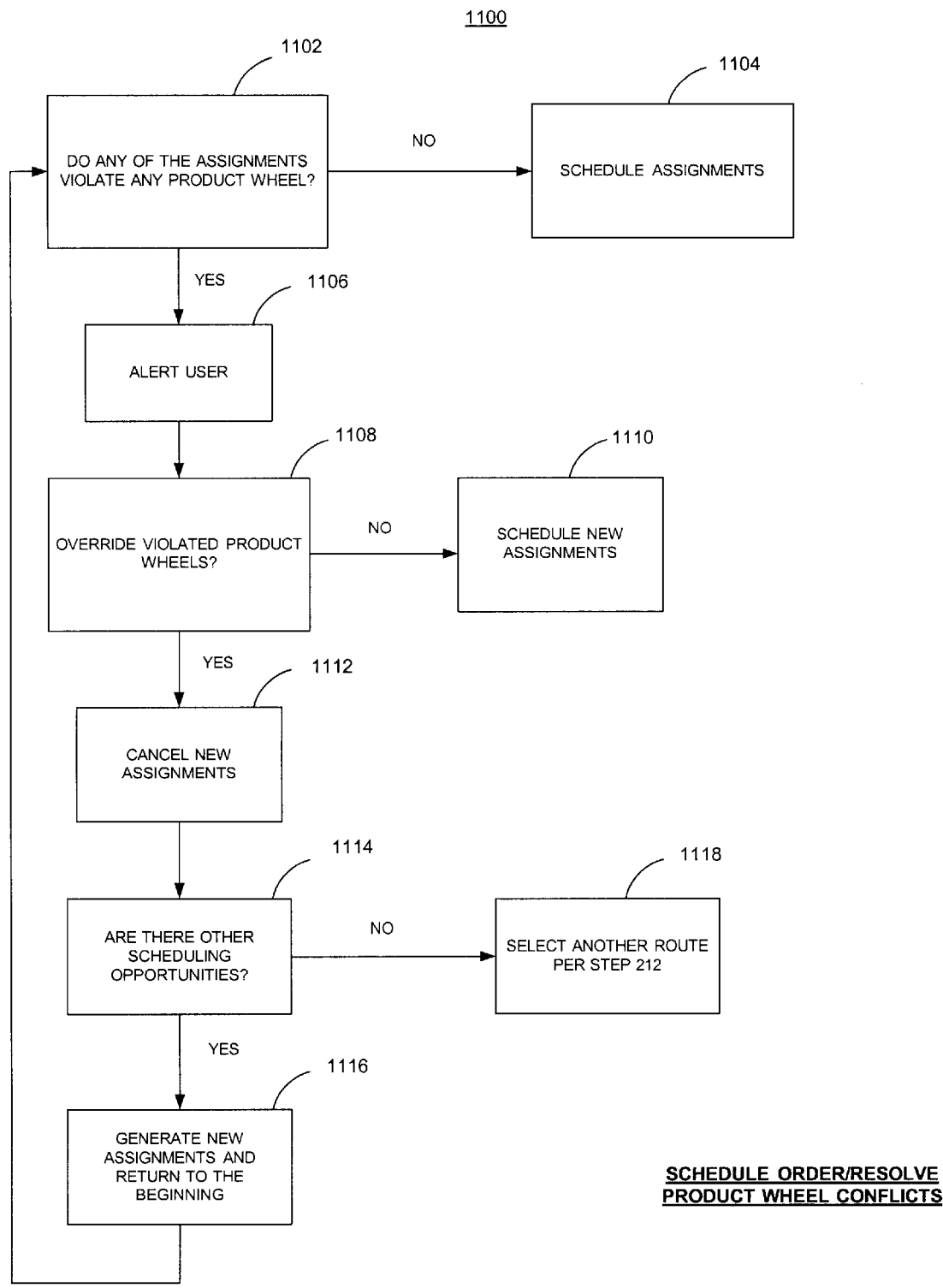
FIG. 11 is a flow diagram for resolving product wheel conflicts.

FIG. 11 depicts a flow process 1100 for accommodating product wheel constraints as generally depicted at step 216 in FIG. 2. Once the assignments have been generated in step 214 (see FIG. 2), the system checks to see if any of the targeted resources are associated with any product wheel, and if so, whether any of the product wheels are violated by one or more of the assignments, at step 1102. If no product wheels have been violated then the assignments are scheduled at step 1104. If, on the other hand, the system determines that one or more product wheels have been violated then the system may alert the user of this fact at step 1106. At step 1108, the system determines whether to override the violated product wheel[s]. If so, then the assignments are scheduled at step 1110. If, on the other hand, it is decided that no product wheel should be violated, then the new assignments are cancelled at step 1112. At step 1114, determine whether there are other scheduling opportunities for the selected route. If so, then at step 1116, generate new assignments for the scheduling opportunities and return to step 1102. If not, then select another route per step 212 of FIG. 2, step 1118.

According to another preferred embodiment of the present invention, the flow process of FIG. 2 may also include the step of packing out excess WIP at step 218. The step of packing out excess WIP performs the step of consuming any excess WIPs generated by an order. Although shown as part of the overall flow process of FIG. 2, the step of packing out excess WIP may be implemented completely independently from the flow process.

For various reasons, such as reducing storage costs, it is highly desirable to minimize excess WIPs kept in inventory. Excess WIPs may exist in inventory for many reasons, such as the conflicting capacity levels of different resources. For example, a resource may only be able to manufacture SKUs in batches rather than continuously. However, suppose an order is scheduled which requires less then the minimum number of SKUs that a resource may be able to produce. As a result, excess SKUs, which may be either WIPs or finished goods, may remain.

Figure 12:
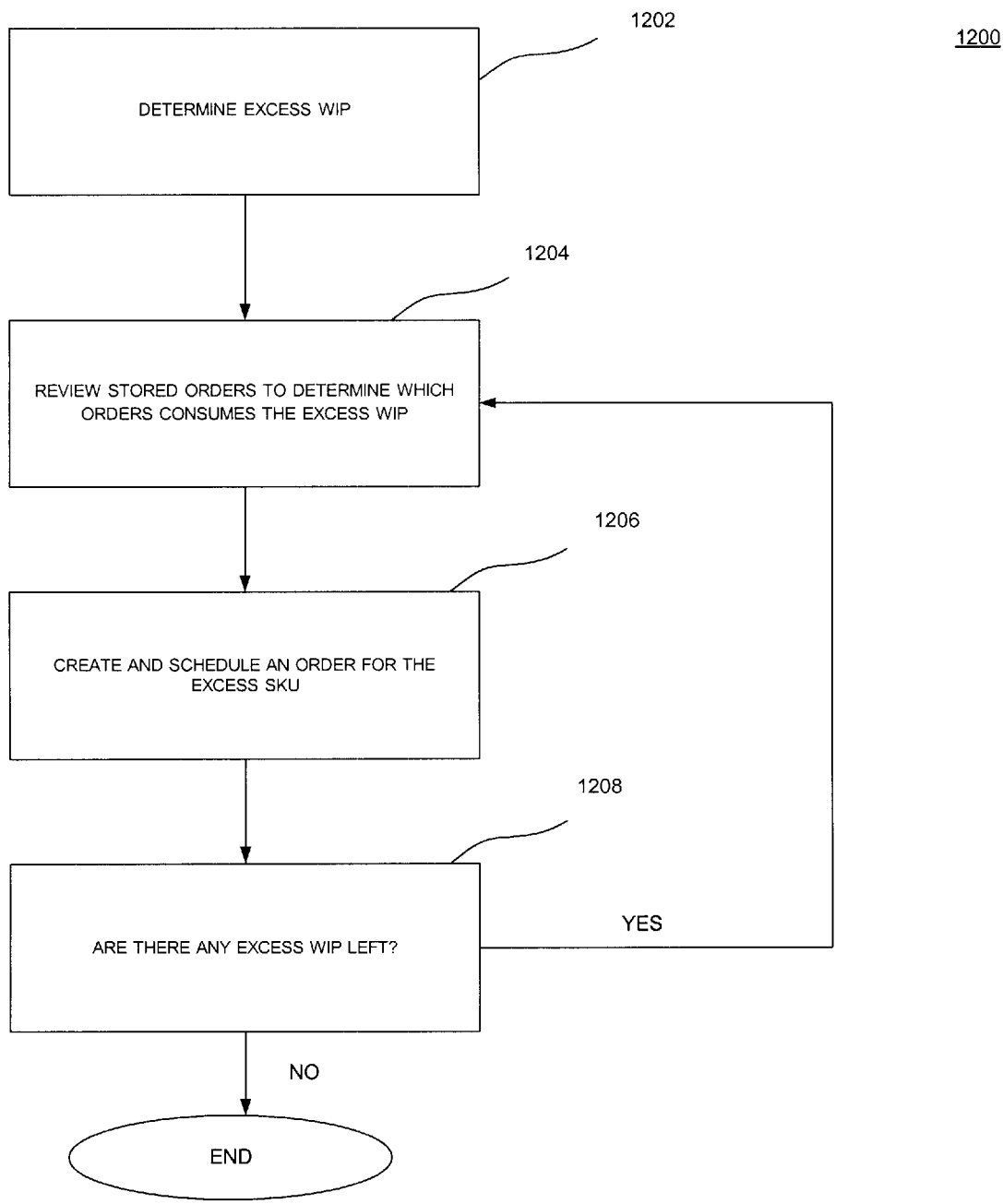
FIG. 12 is a flow diagram for packing out excess work-in-process.

Referring to FIG. 12 depicting a flow process 1200 for packing out excess WIPs. At step 1202, the system determines that excess WIPs exists. This may be accomplished in a number of ways. For example, when scheduling an order the system may make a determination that excess WIPs will be generated as a result of scheduling an order by examining the production method, routes and the scheduling opportunities used for that order. Alternatively, the system may store in the database 172, information relating to all SKUs, both finished goods and WIPs, being generated and/or stored in inventory. The system determines when excess WIPs exists by continuously or by periodically monitoring information stored in the database. If excess WIP is detected then at step 1204 the system reviews stored orders to determine whether any of the stored orders can use the excess WIP during the manufacturing process of fulfilling the orders. This may be accomplished in a number of ways. For example, the system may define all of the SKUs generated (both finished goods and WIPs) by at least two attributes. One attribute could identify those SKUs that should be packed out when excess units exist. The second attribute may define the finished goods that are associated with the SKU. That is, the finished goods that consumes that SKU during the manufacturing process of the finished goods. By using such an attribute to define the SKUs, the system can identify a stored order that uses the excess SKU simply by reviewing the finished goods associated with each of the orders stored by the system. Alternatively, another method that the system may use in determining which of the stored orders may be able to use the excess WIP is to further define the orders by defining the intermediate SKUs required for producing the finished goods. This may be accomplished by at least two ways, by initially identifying all the needed intermediate SKUs for an order when the order is initially created and stored or by using the system to generate production methods for an order when the order is first received and defining the order by the intermediate SKUs required for the production methods generated. Once an order that uses the excess WIP has been identified, the order is scheduled at step 1206. At step 1206 the system determines whether all of the excess WIP have been consumed. If excess WIP still remains then the system goes back to step 1204 to determine and schedule orders that consumes the excess WIP.

Although the steps illustrated in the flow process depicted in FIG. 2 are generally shown to be in a particular order or sequence, there is no strict requirement that each step must be performed in the order generally illustrated in FIG. 2. Further, certain steps may be optional, for example, the packing out step 216 may be optional.

According to another embodiment of the present invention, the system may employ block scheduling. When block scheduling is employed, users can reserve capacity of selected resources to particular product family during specified time intervals. Further, the activities or assignments scheduled during the reserved time interval will be in a particular order similar to the concept of product wheels. Together with the product wheel feature, this feature helps to schedule orders in a way, which results in a more efficient and/or cost effective manner.

To reserve a resource, a block calendar is created and assigned to the resource being reserved. The block calendar includes blocks of time, each having a set start and end times, and a product family assigned to it. When an order for one of the SKUs in the product family is actually scheduled, the assignments for it will be scheduled on the resource during only those blocks allocated to it on the resource's block schedule. A product family is a group of products or SKUs that may be grouped together because they have some common attribute. The foregoing description of the preferred embodiments of the present invention has been presented for the purposes of illustration and description. It is not intended to be exhaustive or to limit the invention to the precise form disclosed. It will be apparent to those of ordinary skill in the art that various modifications and variations can be made to the system and method embodied by the present invention without departing from the spirit or scope of the invention. Thus, it is intended that the present invention covers the modifications and variations of this invention provided that they come within the scope of any claims and their equivalents.

We claim:

1. A system for generating and selecting a planning route and selecting scheduling opportunities according to the selected route, comprising:
    means for defining resources;
    means for receiving an order having an objective;
    means for generating a production method based on said objective and said defined resources;
    means for generating routes based on said production method; and
    means for selecting one of said routes and scheduling opportunities based on a scheduling goal and a routing goal.

2. The system of claim 1, wherein said scheduling goal is selected from the group consisting of maximizing resource utilization, just-in-time, minimize production cost, minimize cycle time and balance resource utilization.

3. The system of claim 2, wherein said routing goal is selected from the group consisting of fast, best and fast on time.

4. The system of claim 1, wherein said routing goal is selected from the group consisting of fast, best and fast on time.

5. The system of claim 1, further comprising a means for creating a product wheel.

6. The system of claim 5, wherein said means for creating a product wheel comprises a means for defining allowed transitions for one of said resources.

7. The system of claim 6, further comprising a means for reviewing said selected route and scheduling opportunities to determine whether said selected route and scheduling opportunities violates said product wheel and selecting another one of said routes generated if said product wheel has been violated.

8. The system of claim 1, further comprising a means for packing out excess work-in-process.

9. The system of claim 8, wherein said means for packing out excess work-in-process comprises the step of identifying said excess work-in-process.

10. The system of claim 9, wherein said means of packing out excess work-in-process comprises a means for identifying orders that consume said excess work-in-process.

11. The system of claim 10, wherein said means for packing out excess work-in-process comprises a means for scheduling said identified orders.

12. The system of claim 11, further comprising a means for assigning a first attribute and a second attribute to a SKU.

13. The system of claim 12, wherein said first attribute indicates whether said SKU needs to be packed out when said SKU is present in excess.

14. The system of claim 13, wherein said second attribute indicates a finished good that is associated with said SKU.

15. The system of claim 1, wherein said means for defining resources comprises a means for defining said resources by identifying starting and ending SKUs, production rates and resource families.

16. The system of claim 15, wherein said means for generating a production method based on said objective and said defined resources further based on said resource families.

17. A system for generating and selecting a planning route and selecting scheduling opportunities according to the selected route, comprising:
    a database storing manufacturing data and receiving and storing an order, wherein said order having an objective;
    a modeling module which defines resources;
    a production method module which generates a production method based on said objective and said defined resources;
    a routing module which generates routes based on said production method; and
    a scheduling manager module which selects one of said routes and scheduling opportunities based on a scheduling goal and a routing goal.

18. The system of claim 17, wherein said scheduling goal is selected from the group consisting of maximizing resource utilization, just-in-time, minimize production cost, minimize cycle time and balance resource utilization.

19. The system of claim 18, wherein said routing goal is selected from the group consisting of fast, best and fast on time.

20. The system of claim 17, wherein said routing goal is selected from the group consisting of fast, best and fast on time.

21. The system of claim 17, further comprising a product wheel module which creates a product wheel.

22. The system of claim 21, wherein said product wheel module further defines allowed transitions for one of said resources.

23. The system of claim 22, where in said product wheel module further reviews said selected route and scheduling opportunities to determine whether said selected route and scheduling opportunities violates said product wheel and selects another one of said routes generated if said product wheel has been violated.

24. The system of claim 17, further comprising a pack out module which packs out excess work-in-process.

25. The system of claim 24, wherein said pack out module packs out excess work-in-process by identifying said excess work-in-process.

26. The system of claim 25, wherein said packing out module further identifies orders that consume said excess work-in-process.

27. The system of claim 26, wherein said packing out module further schedules said identified orders.

28. The system of claim 27, wherein said scheduling manager module assigns a first attribute and a second attribute to a SKU.

29. The system of claim 28, wherein said first attribute indicates whether said SKU needs to be packed out when said SKU is present in excess.

30. The system of claim 29, wherein said second attribute indicates a finished good that is associated with said SKU.

31. The system of claim 17, wherein said modeling module which defines resources is by identifying starting and ending SKUs, production rates and resource families associated with said resources.

32. The system of claim 31, wherein said production method module which generates a production method based on said objective and said defined resources is further based on said resource families.

33. A method for generating and selecting a planning route and selecting scheduling opportunities according to the selected route, comprising the steps:

defining resources;

receiving an order having an objective;

generating a production method based on said objective and said defined resources;

generating routes based on said production method; and selecting one of said routes and scheduling opportunities based on a scheduling goal and a routing goal.

34. The method of claim 33, wherein said scheduling goal is selected from the group consisting of maximizing resource utilization, just-in-time, minimize production cost, minimize cycle time and balance resource utilization.

35. The method of claim 34, wherein said routing goal is selected from the group consisting of fast, best and fast on time.

36. The method of claim 33, wherein said routing goal is selected from the group consisting of fast, best and fast on time.

37. The method of claim 33, further comprising the step of creating a product wheel.

38. The method of claim 37, wherein said step of creating a product wheel comprises the step of defining allowed transitions for one of said resources.

39. The method of claim 38, further comprising the steps of reviewing said selected route and scheduling opportunities to determine whether said selected route and scheduling opportunities violates said product wheel and selecting another one of said routes generated if said product wheel has been violated.

40. The method of claim 33, further comprising the step of packing out excess work-in-process.

41. The method of claim 40, wherein said step of packing out excess work-in-process comprises the step of identifying said excess work-in-process.

42. The method of claim 41, wherein said step of packing out excess work-in-process comprises the step of identifying orders that consume said excess work-in-process.

43. The method of claim 42, wherein said step of packing out excess work-in-process comprises the step of scheduling said identified orders.

44. The method of claim 43, further comprising the step of assigning a first attribute and a second attribute to a SKU.

45. The method of claim 44, wherein said first attribute indicates whether said SKU needs to be packed out when said SKU is present in excess.

46. The method of claim 45, wherein said second attribute indicates a finished good that is associated with said SKU.

47. The method of claim 33, wherein said step of defining resources comprises the step of defining said resources by identifying starting and ending SKUs, production rates and resource families.

48. The method of claim 47, wherein said step of generating a production method based on said objective and said defined resources further based on said resource families.

49. A program storage device readable by a machine, tangibly embodying a program of instructions executable by a machine to perform the steps of generating and selecting a planning route and selecting scheduling opportunities according to the selected route, comprising the steps:

defining resources;

receiving an order having an objective;

generating a production method based on said objective and said defined resources;

generating routes based on said production method; and selecting one of said routes and scheduling opportunities based on a scheduling goal and a routing goal.

50. The program storage device of claim 49, wherein said scheduling goal is selected from the group consisting of maximizing resource utilization, just-in-time, minimize production cost, minimize cycle time and balance resource utilization.

51. The program storage device of claim 50, wherein said routing goal is selected from the group consisting of fast, best and fast on time.

52. The program storage device of claim 49, wherein said routing goal is selected from the group consisting of fast, best and fast on time.

53. The program storage device of 49, further comprising the step of creating a product wheel.

54. The program storage device of claim 53, wherein said step of creating a product wheel comprises the step of defining allowed transitions for one of said resources.

55. The program storage device of claim 54, further comprising the steps of reviewing said selected route and scheduling opportunities to determine whether said selected route and scheduling opportunities violates said product wheel and selecting another one of said routes generated if said product wheel has been violated.

56. The program storage device of claim 49, further comprising the step of packing out excess work-in-process.

57. The program storage device of claim 56, wherein said step of packing out excess work-in-process comprises the step of identifying said excess work-in-process.

58. The program storage device of claim 57, wherein said step of packing out excess work-in-process comprises the step of identifying orders that consume said excess work-in-process.

59. The program storage device of claim 58, wherein said step of packing out excess work-in-process comprises the step of scheduling said identified orders.

60. The program storage device of claim 59, further comprising the step of assigning a first attribute and a second attribute to a SKU.

61. The program storage device of claim 60, wherein said first attribute indicates whether said SKU needs to be packed out when said SKU is present in excess.

62. The program storage device of claim 61, wherein said second attribute indicates a finished good that is associated with said SKU.

63. The program storage device of claim 49, wherein said step of defining resources comprises the step of defining said resources by identifying starting and ending SKUs, production rates and resource families.

64. The program storage device of claim 63, wherein said step of generating a production method based on said objective and said defined resources further based on said resource families.

* * * * *